United States Patent
Lee et al.

(10) Patent No.: US 6,442,128 B1
(45) Date of Patent: Aug. 27, 2002

(54) RECORDING MEDIUM FOR STORING ATTRIBUTE INFORMATION ON BASIC RECORDING UNIT AND METHOD OF IDENTIFYING DATA USING THE ATTRIBUTE INFORMATION

(75) Inventors: Kyung-geun Lee, Seongnam; Jung-wan Ko, Yongin; Seong-sin Joo; In-sik Park, both of Suwon; Joong-eon Seo, Uiwang, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/609,818

(22) Filed: Jul. 3, 2000

(30) Foreign Application Priority Data

Jul. 7, 1999 (KR) .............................. 99-27245

(51) Int. Cl.⁷ .................................. G11B 7/07
(52) U.S. Cl. ................ 369/275.1; 369/275.3; 369/53.1; 369/47.1
(58) Field of Search .............. 369/47.1, 47.11, 369/47.15, 47.21, 47.22, 47.28, 47.31, 53.1, 53.11, 53.2, 59.1, 59.11, 59.13, 59.25, 59.26, 124.01, 275.1, 275.3

(56) References Cited

U.S. PATENT DOCUMENTS

| | | | |
|---|---|---|---|
| 5,173,886 A | 12/1992 | Satoh et al. | |
| 6,195,325 B1 * | 2/2001 | Okanishi | 369/124.08 |
| 6,252,838 B1 * | 6/2001 | Kurada et al. | 369/47.28 |
| 6,256,282 B1 * | 7/2001 | Yamagami et al. | 369/275.3 X |

FOREIGN PATENT DOCUMENTS

| | | |
|---|---|---|
| EP | 0425125 A2 | 5/1991 |
| EP | 0837471 | 4/1998 |
| EP | 0926664 | 6/1999 |
| JP | 10-134496 | 5/1998 |
| TW | 392151 | 6/1989 |

OTHER PUBLICATIONS

ECMA Standardizing Information and Communication Systems XP–002172797, Standard ECMA–273, 120 mm DVD Rewritable Disk (DVD–RAM), Jun. 1999.
ECMA Standardizing Information and Communication Systems XP–002172798, Standard ECMA–273, 80 mm (1.23 Gbytes per side) and 120 mm (3,95 Gbytes per side) DVD–Recordable Disk (DVD–R), Dec. 1998.

* cited by examiner

*Primary Examiner*—Muhammad Edun
(74) *Attorney, Agent, or Firm*—Staas & Halsey LLP

(57) ABSTRACT

A recording medium for storing attribute information in a basic recording unit and a method of identifying data using the attribute information. On the recording medium, the attributes such as sector format, tracking method, reflectivity, area type, data type, and the number of layers of a sector are stored. For digital versatile disc-recordables (DVD-Rs), digital versatile disc-rewritables (DVD-RWs) and digital versatile disc-random access memory (DVD-RAM) on which data can be recorded and reproduced a multitude of times, information is stored relating to the attributes of a sector, which is a basic recording unit. In particular, information relating to data type, which represents whether the data is rewritable data, read-only, or linking data, can be stored in data identification data (DID) areas or identification data (ID) areas, which is positioned at the fronts of the sectors for representing all information relating thereto. Using combinations of the attribute information, it can be determined whether the data is linking data, and if not linking data, whether the data is read only or rewritable. Accordingly, consistency among optical recording media of the DVD-type discs is maintained.

53 Claims, 2 Drawing Sheets

| | b31 | b30 | b29 | b28 | b27 b26 | b25 | b24 |
|---|---|---|---|---|---|---|---|
| | SECTOR FORMAT TYPE | TRACKING METHOD | REFLECTIVITY | DATA TYPE 2 | AREA TYPE | DATA TYPE 1 | LAYER NUMBER |
| R | 0:CLV FORMAT 1:ZONED FORMAT | 0:PIT TRACKING 1:GROOVE TRACKING | 0:>40% 1:≤40% | 0:RESERVED 1:LINKING DATA | 00:DATA AREA 01:LEAD-IN 10:LEAD-OUT 11:MIDDLE AREA OF READ ONLY DISCS | 0:READ-ONLY 1:RESERVED | 0:LAYER 0 OF DUAL LAYER DISCS OR SINGLE LAYER DISKS |
| RW | | | | | | | |
| RAM | | | | RESERVED | 00:DATA AREA 01:LEAD-IN 10:LEAD-OUT 11:RESERVED | 0:READ-ONLY 1:REWRITABLE | 1:LAYER 1 OF DUAL LAYER DISCS |

(Header row above data table: b31 / b24 b23 ... b0 — SECTOR INFORMATION | SECTOR NUMBER)

FIG. 1 (PRIOR ART)

| | b31 | b30 | b29 | b28 | b27 b26 | b25 | b24 |
|---|---|---|---|---|---|---|---|
| | SECTOR FORMAT TYPE | TRACKING METHOD | REFLECTIVITY | RESERVED | AREA TYPE | DATA TYPE | LAYER NUMBER |
| R/RW | 0:CLV FORMAT<br>1:ZONED FORMAT | 0:PIT TRACKING<br>1:GROOVE TRACKING | 0:>40%<br>1:≤40% | RESERVED | 00:DATA AREA<br>01:LEAD-IN<br>10:LEAD-OUT<br>11:MIDDLE AREA OF READ ONLY DISCS | 0:READ-ONLY<br>1:LINKING DATA | 0:LAYER 0 OF DUAL LAYER DISCS OR SINGLE LAYER DISKS<br>1:LAYER 1 OF DUAL LAYER DISCS |
| RAM | | | | | 00:DATA AREA<br>01:LEAD-IN<br>10:LEAD-OUT<br>11:RESERVED | 0:READ-ONLY<br>1:REWRITABLE | |

| b31 | b24 b23 | b0 |
|---|---|---|
| SECTOR INFORMATION | SECTOR NUMBER | |

FIG. 2

| | b31 | b24 b23 | | | | | | b0 |
|---|---|---|---|---|---|---|---|---|
| | SECTOR INFORMATION | | SECTOR NUMBER | | | | | |

| | b31 | b30 | b29 | b28 | b27 b26 | b25 | b24 |
|---|---|---|---|---|---|---|---|
| | SECTOR FORMAT TYPE | TRACKING METHOD | REFLECTIVITY | DATA TYPE 2 | AREA TYPE | DATA TYPE 1 | LAYER NUMBER |
| R | | 0:PIT TRACKING<br>1:GROOVE TRACKING | 0:>40%<br>1:≤40% | 0:RESERVED<br>1:LINKING DATA | 00:DATA AREA<br>01:LEAD-IN<br>10:LEAD-OUT<br>11:MIDDLE AREA OF READ ONLY DISCS | 0:READ-ONLY<br>1:RESERVED | 0:LAYER 0 OF DUAL LAYER DISCS OR SINGLE LAYER DISKS<br>1:LAYER 1 OF DUAL LAYER DISCS |
| RW | 0:CLV FORMAT<br>1:ZONED FORMAT | | | RESERVED | 00:DATA AREA<br>01:LEAD-IN<br>10:LEAD-OUT<br>11:RESERVED | 0:READ-ONLY<br>1:REWRITABLE | |
| RAM | | | | | | | |

RECORDING MEDIUM FOR STORING ATTRIBUTE INFORMATION ON BASIC RECORDING UNIT AND METHOD OF IDENTIFYING DATA USING THE ATTRIBUTE INFORMATION

CROSS-REFERENCE TO RELATED APPLICATIONS

This application claims the benefit of Korean Application No. 99-27245, filed Jul. 7, 1999, in the Korean Industrial Property Office, the disclosure of which is incorporated herein by reference.

BACKGROUND OF THE INVENTION

1. Field of the Invention

The present invention relates to an optical recording medium and more particularly, to a recording medium for storing attribute information on a sector, which is a basic recording unit, and a method of identifying the type of data using the attribute information.

2. Description of the Related Art

In optical discs like digital versatile disc (DVD)-type discs, a sector is the minimum division unit for data access ("basic recording unit", and at the front of each sector, there is positioned an identification data (ID) area containing all information about (attributes of) the sector. This ID area corresponds to a data identification data (DID) area in a digital versatile disc-random access memory (DVD-RAM). Specifically, identification information in the ID area, to which 4 bytes are assigned per sector, includes sector information and sector number as shown in FIG. 1. The sector information contains sector format type, tracking method, reflectivity, linking type, area type, data type, and layer number.

The detailed structure of the currently prescribed sector information area of a digital versatile disc-recordable (DVD-R) and a digital versatile disc-rewritable (DVD-RW) will be described with reference to FIG. 1. The sector format type of bit position b31 indicates whether the sector format is constant linear velocity (CLV) or zoned constant linear velocity (ZCLV) as follows:

0: CLV format type

1: Zoned format type

The tracking method of bit position b30 indicates whether the tracking method is pit tracking or groove tracking as follows:

0: Pit tracking

1: Groove tracking

The reflectivity of bit position b29 indicates whether the reflectivity is greater than, or less than or equal to 40% as follows:

0: greater than 40%

1: less than or equal to 40%

Bit position b28 is reserved.

The area type of bit positions b26 and b27 indicates whether the area is a data area, lead-in area, lead-out area, or the middle area of read-only discs as follows:

00: data area

01: lead-in area

10: lead-out area

11: middle area of read-only discs

The data type of bit position b25 denotes whether the data is read-only or linking data as follows:

0: Read-only data

1: Linking data

Finally, the layer number of bit position b24 denotes whether the layer number is of single or dual layer discs as follows:

0: Layer 0 of dual layer discs or single layer discs

1: Layer 1 of dual layer discs.

As shown in FIG. 1, among the currently prescribed sector information of a DVD-RAM, the sector format type of bit position b31, tracking method of bit position b30, reflectivity of bit position b29, reserved bit of b28, and layer number of bit position 24 are the same as the corresponding contents and bit positions defined in the DVD-R/RW. Area and data types prescribed in the DVD-RAM will follow. The area type of bit positions b27 and b26 indicates whether the area is a data area, lead-in area, lead-out area, or reserved area as given below:

00: data area

01: lead-in area

10: lead-out area

11: reserved

The data type of bit position b25 denotes whether the data is read-only or rewritable data as given below:

0: Read-only data

1: Rewritable

The structure of the ID area described above has the following problems. In the case of the DVD-RW, the basic physical format utilizes DVD-R standards, so that the data of each sector includes only read-only and linking data. DVD-RWs are remarkably different from DVD-Rs in that data can be erased and re-recorded numerous times. However, the ID area of DVD-RWs is not defined to indicate whether or not the type of data recorded in a basic recording unit is rewritable data. Therefore, there is a need for a method or area for indicating upfront that rewritable data is recorded in a sector.

Thus, a method of representing all three types of data stored on a DVD-RW(read-only, linking and rewritable) is basically required. Furthermore, a method of using another bit is also required because three types of data are not recordable with only 1 bit (See bit position b25 in FIG. 1.) under the conventional standard. However, for the sake of the consistency of ID area structures that DVD-type discs have, the data type needs to be divided into practically usable data such as read-only and rewritable data, and otherwise such as linking data.

SUMMARY OF THE INVENTION

To solve the above problems, it is an object of the present invention to provide a recording medium for storing information which indicates data type as distinguished between rewritable, read-only, or linking data on an identification data (ID) area where information relating to basic recording units is stored on a unit-by-unit basis.

It is another object to provide a recording medium for storing information about the data type, which is classified into practically-usable data such as read-only and rewritable data and non-practically-usable data such as linking data, for the consistency of ID area structures which DVD-type discs have.

It is another object to provide a recording medium on which the data type may be indicated using attribute information stored in an ID area, for the consistency of ID structures which DVD-type discs have.

It is another object to provide a method of identifying the data using information about data type which is stored in an ID area which can store all information about basic recording units on a unit-by-unit basis and is classified into practically usable data such as read-only and rewritable data and non-practically usable data such as linking data.

It is another object to provide a method of determining whether the data recorded in a basic recording unit is rewritable data, read-only data, or linking data, using attribute information stored in an ID area.

It is a further object to provide a recording medium and method by which combinations of data recorded in a basic recording unit are used to distinguish between rewritable data, read-only data, and linking data.

It is a still further object to provide a recording medium and method by which combinations of data recorded in a basic recording unit using a conventional standard are used to distinguish between rewritable data, read-only data, and linking data.

Additional objects and advantages of the invention will be set forth in part in the description which follows and, in part, will be obvious from the description, or may be learned by practice of the invention.

Accordingly, to achieve the above objects of the present invention, there is provided a recording medium for storing information relating to the attributes of a basic recording unit in a predetermined area, wherein information representing the data type of data recorded in the basic recording unit as read-only, rewritable or linking data, is stored in the predetermined area Furthermore, there is provided a recording medium for storing a plurality of kinds of field information representing the attributes of a basic recording unit in a predetermined area, wherein the recording medium indicates whether data recorded in the basic recording unit is read-only, rewritable, or linking data by combining two or more kinds of field information selected from the attribute information.

A method of determining data recorded on a recording medium in which information in a basic recording unit is stored in a predetermined area, includes reading out information relating to data type selected from attribute information stored in the predetermined area, and determining whether data recorded in the basic recording unit is read-only, rewritable or linking data, based on the data type information.

Moreover, a method of determining data recorded on a recording medium, in which a plurality of kinds of field information denoting various attributes of a basic recording unit is stored in a predetermined area, includes combining a predetermined number of different kinds of field information, and determining whether the data recorded in a basic recording unit is read-only, rewritable, or linking data, based on the combined field information.

BRIEF DESCRIPTION OF THE DRAWINGS

The above objects and advantages of the present invention will become more apparent by describing in detail preferred embodiments thereof with reference to the attached drawings in which:

FIG. 1 illustrates the configuration of a conventional identification data (ID) area of digital versatile disc (DVD)-type discs; and FIG. 2 illustrates the configuration of an ID area according to a preferred embodiment of the present invention.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

As shown in FIG. 1, in order to specify the data type of a sector, among the attributes of the sector, it is sufficient to simply indicate with bit position b25 the read-only and rewritable data in a digital versatile disc-random access memory (DVD-RAM), and the read-only and linking data in a digital versatile disc-recordable (DVD-R). However, the specification for a digital versatile disc-rewritable (DVD-RW) calls for a mechanism for indicating a rewritable data type.

FIG. 2 shows the configuration of an identification data (ID) area for a DVD-R/RW/RAM according to one preferred embodiment of the present invention. In the case of a DVD-RW, to distinguish practically-usable data such as rewritable and read-only data from linking data, a reserved bit b28 is used as a linking data flag, positively indicating linking data. If the bit b28 of a sector has the value "1", that indicates that the sector contains linking data. For the sake of conformity, a DVD-R also uses bit b28 for indicating linking data among the data types as shown in FIG. 2. In the case of a DVD-RAM, the conventional specification shown in FIG. 1 is applicable.

In the case of a DVD-R, when linking data is indicated by the bit b28, the presence of "0" in bit b25 positively indicates read-only data, and the presence of "1" in bit b25 indicates a reserved area. In the case of a DVD-RW, "0" and "1" in the bit b25 positively indicates readonly and rewritable data, respectively.

According to another preferred embodiment of the present invention, classifying by data as either practically-usable data, such as read-only and rewritable data, and non practically-usable data, such as linking data, linking data can be represented by means of bit b28, and read-only data and rewritable data can be distinguished from each other by means of the reflectivity of bit b29. Since the reflectivity of read-only data is about 60–70% and that of rewritable data is less than 30%, a drive can identify rewritable data by the reflectivity ratio. Thus, this difference may be described in the specification for the DVD-RW.

In addition, according to another preferred embodiment of the present invention for representing rewritable data as well as read-only and linking data under the conventional ID structure shown in FIG. 1, if rewritable data in a DVD-RW is further specified in reserved bit b28, all these types of data can be directly indicated by bits b28 and b25.

According to another preferred embodiment of the present invention for representing rewritable data as well as read-only and linking data under the conventional ID structure, read-only and linking data are indicated by bit b25 according to the conventional standard, while a drive can determine whether or not data recorded in the present sector is rewritable data from the reflectivity, which can be described in the specification for the DVD-RW. The reflectivity, as described above, differs greatly depending on whether the data recorded in a sector is rewritable or read-only data.

According to yet another preferred embodiment of the present invention for representing a rewritable data as well as read-only and linking data under the conventional ID structure, rewritable data can be identified by combining two or more kinds of field information among the attribute information of an ID area. Thus, since a drive already recognizes that the recording medium to be used is a DVD-R, a DVD RW or a DVD-RAM, in the case of a DVD-RW, the data type of a sector can be determined by combining area type and reflectivity, sector format type and reflectivity, or tracking method and area type.

Specifically, since only read-only data is recorded in lead-in and lead-out areas, and rewritable data is recorded only on a data area, a drive can determine whether or not data recorded in the sector is rewritable data through the combination of area type information with reflectivity information, which can only be described in the specification for the DVD-RW. Lead-in and lead-out areas have a constant linear velocity (CLV) format and a data area has a zoned format, so a drive can determine whether or not data recorded in the sector is rewritable data through the combination of sector format information with reflectivity information, which can only be described in the specification. Furthermore, since pit and groove tracking methods are applied to lead-in and lead-out areas, and data area, respectively, a drive may determine whether or not data recorded in the sector is rewritable data through the combination of tracking information with area type information, which can only be described in the specification.

The present invention is not restricted to the case where two kinds of field information are combined among the attribute information of an ID area. There may be a combination of two or more kinds of field information. Moreover, the present invention can be applied to recording media such as DVD-Rs, DVD-RWs, DVD-RAMs, and DVD plus RWs (DVD+RWs).

As described in the foregoing, the present invention makes it possible to determine all types of data by storing information relating to data type in such a way as to divide the data type into practically usable data such as read-only and rewritable data and non-practically-usable data such as linking data. Alternatively, all types of data can be determined by using two or more kinds of field information selected from sector information such as reflectivity, sector format type, area type, tracking method, and data type. According to the present invention, therefore, even in the case of a DVD-RW rewritable data can be determined as well as read-only and linking data, which allows for consistency in the standards of DVD-type discs.

Although a few preferred embodiments of the present invention have been shown and described, it would be appreciated by those skilled in the art that changes may be made in this embodiment without departing from the principles and spirit of the invention, the scope of which is defamed in the claims and their equivalents.

What is claimed is:

1. A recording medium comprising a predetermined area in which information relating to attributes of a basic recording unit is stored, wherein the information representing a data type of data recorded in the basic recording unit makes distinguishable read-only, rewritable, and linking data.

2. The recording medium of claim 1, wherein information representing the data type is stored by classifying the data type into a first data type, and a second data type wherein the first data type comprises read-only and rewritable data, and the second data type comprises linking data.

3. The recording medium of claim 1, wherein the predetermined area is a data identification data area or an identification data area, and the predetermined area is positioned at the front of the basic recording unit.

4. The recording medium of claim 1, wherein the recording medium is either a digital versatile disc-rewritable, a digital versatile disc-recordable, a digital versatile disc-random access memory, or a digital versatile disc plus rewritable.

5. The recording medium of claim 1, wherein said predetermined area comprises an identification data area and a sector information region within the identification data area, wherein the data type information is stored in the sector information region using 2 bits.

6. The recording medium of claim 5, wherein one of the two bits represents linking data, and the other bit represents read-only or rewritable data.

7. The recording medium of claim 5, wherein one of the bits represents rewritable data, and the other bit represents read-only data or linking data.

8. The recording medium of claim 5, wherein one of the bits represents linking data, and the other bit uses attribute information relating to reflectivity to represent read-only data or rewritable data.

9. A recording medium comprising a predetermined area in which a plurality of kinds of field information representing the attributes of a basic recording unit are stored, wherein the recording medium distinguishes between data recorded in the basic recording unit is read-only, rewritable, or linking data by combining at least two kinds of field information selected from the attribute information stored in the predetermined area.

10. The recording medium of claim 9, wherein the predetermined area is a data identification data area or an identification data area, and the predetermined area is positioned at the front of the basic recording unit.

11. The recording medium of claim 9, wherein the recording medium is either a digital versatile disc-rewritable, a digital versatile disc-recordable, a digital versatile disc-random access memory, or a digital versatile disc plus rewritable.

12. The recording medium of claim 9, wherein the recording medium distinguishes between data recorded in the basic recording unit as read-only data or linking data using field information relating to data type stored as the attribute information, and distinguishes whether data recorded in the basic recording unit is rewritable data using at least two kinds of field information selected from the field information which includes sector format type, tracking method, reflectivity, and area type.

13. The recording medium of claim 9, wherein the recording medium indicates whether the data recorded in the basic recording unit is read-only data or linking data using the field information relating to data type stored as the attribute information, and indicates whether the data recorded in the basic recording unit is rewritable data using the field information indicating reflectivity and area type.

14. The recording medium of claim 9, wherein the recording medium indicates whether the data recorded in the basic recording unit is read-only data or linking data using the field information relating to data type stored as the attribute information, and indicates whether the data recorded in the basic recording unit is rewritable data using the field information indicating sector format type and reflectivity.

15. The recording medium of claim 9, wherein the recording medium indicates whether the data recorded in the basic recording unit is read-only data or linking data using the field information relating to data type stored as the attribute information, and indicates whether the data recorded in the basic recording unit is rewritable data using the field information indicating tracking method and area type.

16. A method of determining data recorded on a recording medium in which attribute information in a basic recording unit is stored in a predetermined area, the method comprising:

reading out information relating to data type selected from attribute information stored in the predetermined area; and determining whether the data type of the data recorded in the basic recording unit by distinguishing between read-only, rewritable and linking data using the data type information.

17. The method of claim 16, wherein said determining comprises classifying the data type into a first data type, and a second data type, wherein the first data type comprises read-only and rewritable data, and the second data type comprises linking data.

18. The method of claim 16, wherein said determining comprises using 2 bits within a sector information region of an identification data area which is positioned at the front of the basic recording unit, one of the bits representing linking data, and the other bit representing read-only or rewritable data.

19. The method of claim 16, wherein said determining comprises using 2 bits within a sector information region of an identification data area which is positioned at the front of the basic recording unit, one of the bits representing linking data, and the other bit representing read-only or rewritable data by using attribute information relating to reflectivity.

20. The method of claim 16, wherein said determining comprises using 2 bits within a sector information region of an identification data area which is positioned at the front of the basic recording unit, one of the bits representing rewritable data, and the other bit representing read-only or linking data.

21. A method of determining data recorded on a recording medium, in which a plurality of kinds of field information denoting various attributes of a basic recording unit is stored in a predetermined area, the method comprising:

combining a predetermined number of different kinds of field information; and determining whether the data recorded in the basic recording unit is read-only, rewritable, or linking data, by distinguishing whether the data is read-only, rewritable, or linking data based on the combined field information.

22. The method of claim 21, wherein said determining comprises using the field information relating to data type selected from the plurality of kinds of field information to distinguish whether data recorded in the basic recording unit is read-only or linking data, and in a basic recording unit is rewritable data by means of using a combination of two or more kinds of field information including sector format type, tracking method, reflectivity, and area type to distinguish whether data recorded in the basic recording unit is rewritable data.

23. A recording medium having a predetermined area within a respective basic recording unit comprising:

a plurality of kinds of field information representing the attributes of the data stored in the basic recording unit, wherein combinations of the field information make distinguishable whether the basic recording unit stores rewritable data as opposed to read only or linking data.

24. The recording medium of claim 23, wherein the combinations comprise a first data type and a second data type, where the first data type comprises attribute information which indicates linking data, and the second data type comprises attribute information which differentiates between rewritable data and read only data.

25. The recording medium of claim 24, wherein the first data type comprises attribute information which positively indicates the stored data stored is linking data.

26. The recording medium of claim 25, wherein the second data type comprises reflectivity information, wherein the reflectivity information indicates whether the stored data is rewritable data.

27. The recording medium of claim 25, wherein the second data type comprises attribute information which positively indicates whether the stored data is rewritable data.

28. The recording medium of claim 25, wherein the second data type comprises sector format type information, wherein the sector format type information indicates whether the stored data is rewritable data.

29. The recording medium of claim 23, wherein the combinations comprise a first data type and a second data type, where the first data type comprises attribute information which differentiates between linking data and rewritable data, and the second data type comprises attribute information which indicates read only data.

30. The recording medium of claim 29, wherein the first data type comprises reflectivity information, wherein the reflectivity information indicates whether the stored data is rewritable data.

31. The recording medium of claim 30, wherein the second data type comprises sector format information, wherein the sector format information indicates the format of the stored data is read only data.

32. The recording medium of claim 30, wherein the second data type comprises area type information, wherein the area type information indicates whether the stored data is read only data.

33. The recording medium of claim 23, wherein the combination comprises attribute information which indicates whether the tracking method, and attribute information which indicates the area type.

34. The recording of claim 23, wherein the digital recording medium is a digital versatile disc-rewritable.

35. The recording medium of claim 34, wherein the combinations comprise a first data type and a second data type, where the first data type comprises attribute information which indicates linking data, and the second data type comprises attribute information which differentiates between rewritable data and read only data.

36. The recording medium of claim 35, wherein the first data type comprises attribute information which positively indicates the stored data stored is linking data.

37. The recording medium of claim 36, wherein the second data type comprises reflectivity information, wherein the reflectivity information indicates whether the stored data is rewritable data.

38. The recording medium of claim 36, wherein the second data type comprises attribute information which positively indicates whether the stored data is rewritable data.

39. The recording medium of claim 36, wherein the second data type comprises sector format type information, wherein the sector format type information indicates whether the stored data is rewritable data.

40. The recording medium of claim 34, wherein the combinations comprise a first data type and a second data type, where the first data type comprises attribute information which differentiates between linking data and rewritable data, and the second data type comprises attribute information which indicates read only data.

41. The recording medium of claim 40, wherein the first data type comprises reflectivity information, wherein the reflectivity information indicates whether the stored data is rewritable data.

42. The recording medium of claim 41, wherein the second data type comprises sector format information, wherein the sector format information indicates the format of the stored data is read only data.

43. The recording medium of claim 41, wherein the second data type comprises area type information, wherein the area type information indicates whether the stored data is read only data.

44. The recording medium of claim 34, wherein the combination comprises attribute information which indicates whether the tracking method, and attribute information which indicates the area type.

45. A recording medium comprising:
a basic recording units, each basic recording unit having an identification area comprising:
a plurality of bits which indicate attribute information of the data stored in said basic recording unit,
wherein combinations of bit positions of said plurality of bits differentiate rewritable data from read only and linking data.

46. The recording medium of claim 45, wherein a combination comprises two bits, a first bit and a second bit, wherein the first bit positively indicates whether data stored in said basic recording unit is linking data.

47. The recording medium of claim 46, wherein the second bit indicates reflectivity of the stored data, wherein the reflectivity indicates whether the stored data is rewritable data.

48. The recording medium of claim 46, wherein the second bit positively indicates the stored data type is read only data.

49. The recording medium of claim 46, wherein the second bit positively indicates the stored data type is rewritable data.

50. The recording medium of claim 45, wherein the combination comprises a first combination of bits, and a second bit, wherein the first combination of bits indicates the area type, wherein the area type indicates whether the stored data is read only data.

51. The recording medium of claim 50, wherein the second bit indicates reflectivity of the stored data, wherein the reflectivity indicates whether the stored data is rewritable data.

52. The recording medium of claim 50, wherein the second bit indicates tracking method of the stored data, wherein the tracking method indicates whether the stored data is rewritable data.

53. The recording medium of claim 45, wherein a combination comprises a first bit which indicates sector format type of the stored data, and a second bit which indicates reflectivity of the stored data, wherein the sector format type indicates whether the data stored in said basic recording unit is read only data, and the reflectivity indicates whether the data stored in said basic recording unit is rewritable data.

* * * * *